US012616968B2

(12) United States Patent
Schuhn et al.

(10) Patent No.: US 12,616,968 B2
(45) Date of Patent: May 5, 2026

(54) MOBILE PHASE SUPPLY DEVICE WITH FLUIDICALLY NORMALLY CLOSED PORT AND CAP DEVICES

(71) Applicant: Agilent Technologies, Inc., Santa Clara, CA (US)

(72) Inventors: Bettina Schuhn, Karlsruhe (DE); Uwe Effelsberg, Karlsruhe (DE); Manuel van Venrooy, Karlsruhe (DE); Matthias Kamuf, Bruchsal (DE)

(73) Assignee: Agilent Technologies, Inc., Santa Clara, CA (US)

( * ) Notice: Subject to any disclaimer, the term of this patent is extended or adjusted under 35 U.S.C. 154(b) by 990 days.

(21) Appl. No.: 17/736,911

(22) Filed: May 4, 2022

(65) Prior Publication Data

US 2022/0371002 A1 Nov. 24, 2022

(30) Foreign Application Priority Data

May 20, 2021 (GB) ...................................... 2107241

(51) Int. Cl.
*B01L 3/02* (2006.01)

(52) U.S. Cl.
CPC ..... *B01L 3/0293* (2013.01); *B01L 2200/0684* (2013.01); *B01L 2200/0689* (2013.01); *B01L 2300/042* (2013.01); *B01L 2300/0851* (2013.01); *B01L 2400/0611* (2013.01)

(58) Field of Classification Search
CPC ........... B01L 3/0293; B01L 2200/0684; B01L 2200/0689; B01L 2300/042; B01L 2300/0851; B01L 2400/0611
See application file for complete search history.

(56) References Cited

U.S. PATENT DOCUMENTS

| | | | | |
|---|---|---|---|---|
| 8,052,014 | B2 * | 11/2011 | Hasegawa ............ | B67D 7/0294 137/212 |
| 2015/0314246 | A1 | 11/2015 | Lehtonen | |
| 2019/0346301 | A1 | 11/2019 | Freiburger et al. | |

FOREIGN PATENT DOCUMENTS

| | | | |
|---|---|---|---|
| CN | 203332607 | U | 12/2013 |
| CN | 107340349 | A | 11/2017 |
| CN | 207107352 | U | 3/2018 |
| CN | 207232108 | U | 4/2018 |
| CN | 108482838 | A | 9/2018 |
| EP | 1577012 | A1 | 9/2005 |
| EP | 3235441 | A1 | 10/2017 |
| GB | 2531176 | A | 4/2016 |

(Continued)

OTHER PUBLICATIONS

Combined Search and Examination Report under Sections 17 and 18(3) dated Nov. 22, 2021 for application GB2107241.8; 8 pages.

*Primary Examiner* — Charles Capozzi
*Assistant Examiner* — Michael Stanley Gzybowski

(57) ABSTRACT

A mobile phase supply device, for supplying a mobile phase for a sample separation apparatus for separating a fluidic sample, includes a fluidically normally closed cap device configured to be mounted on a mobile phase container containing a mobile phase, and a fluidically normally closed port device configured for being mechanically connected with the cap device in such a way that, upon establishing a mechanical connection between the port device and the cap device, both the port device and the cap device are converted into a fluidically opened configuration.

19 Claims, 7 Drawing Sheets

(56) References Cited

FOREIGN PATENT DOCUMENTS

| | | | |
|---|---|---|---|
| JP | 5039456 | B2 | 7/2012 |
| WO | 2019126130 | A1 | 6/2019 |

* cited by examiner

MOBILE PHASE SUPPLY DEVICE WITH FLUIDICALLY NORMALLY CLOSED PORT AND CAP DEVICES

RELATED APPLICATIONS

This application claims priority to UK Application No. 2107241.8, filed May 20, 2021, the entire contents of which are incorporated herein by reference.

TECHNICAL FIELD

The present invention relates to a mobile phase supply device for and a method of supplying a mobile phase for a sample separation apparatus for separating a fluidic sample, and a sample separation apparatus.

BACKGROUND

In liquid chromatography, a fluidic analyte may be pumped through a column comprising a material which is capable of separating different components of the fluidic analyte. Such a material, so-called beads, may be filled into a column tube which may be connected to other elements (like a control unit, containers including sample and/or buffers). Upstream of a column, the fluidic sample or analyte is loaded into the liquid chromatography apparatus. A controller controls an amount of fluid to be pumped through the liquid chromatography apparatus, including controlling a composition and time-dependency of a solvent interacting with the fluidic analyte. Such a solvent may be a mixture of different constituents, denoted as mobile phase.

Usually, mobile phase is contained in mobile phase containers such as bottles into which a tubing extends through which mobile phase is pumped from the mobile phase container for consumption by a sample separation apparatus. Conventional approaches suffer from a risk of contamination of a user with mobile phase (which may be an aggressive chemical), for instance due to splashing or dripping solvents. Furthermore, such conventional approaches may be cumbersome for a user, since it may be required for the user to handle multiple pieces of tubing and to handle open mobile phase containers above head height.

SUMMARY

It is an object of the invention to supply a mobile phase in a safe and user-friendly way.

According to an exemplary embodiment, a mobile phase supply device for supplying a mobile phase for a sample separation apparatus for separating a fluidic sample is provided, wherein the mobile phase supply device comprises a fluidically normally closed cap device mounted or configured to be mounted on a mobile phase container containing a mobile phase, and a fluidically normally closed port device configured for being mechanically connected with the cap device in such a way that, upon establishing a mechanical connection between the port device and the cap device, both the port device and the cap device are converted into a fluidically opened configuration.

According to another exemplary embodiment, a sample separation apparatus for separating a fluidic sample is provided, wherein the sample separation apparatus comprises a fluid drive for driving a mobile phase and the fluidic sample when injected in the mobile phase, a sample separation unit for separating the fluidic sample in the mobile phase, and a mobile phase supply device having the above-mentioned features for supplying the mobile phase to the fluid drive.

According to still another exemplary embodiment of the invention, a method of supplying (in particular using a mobile phase supply device having the above-mentioned features) a mobile phase to a sample separation apparatus for separating a fluidic sample is provided, wherein the method comprises mounting a fluidically normally closed cap device on a mobile phase container containing a mobile phase, and mechanically connecting a fluidically normally closed port device with the cap device in such a way that, upon establishing a mechanical connection between the port device and the cap device, both the port device and the cap device are converted into a fluidically opened configuration in which mobile phase is supplied from the mobile phase container via the cap device and the port device into the sample separation apparatus.

In the context of the present application, the term “mobile phase supply device” may particularly denote an arrangement of cooperating members enabling and managing a supply of a mobile phase to one or more mobile phase consuming units of a sample separation apparatus.

In the context of the present application, the term “cap device” may particularly denote a device covering a mobile phase outlet of a mobile phase container for protecting the mobile phase container against a flow out of mobile phase in a closed configuration, until the cap device is operated to be converted into an open configuration. An accommodation recess of the cap device may be shaped to enable a form closure coupling with the outlet of the mobile phase container.

In the context of the present application, the term “port device” may particularly denote a device configured for providing a controllable fluidic interface between, on the one hand, the cap device with a fluidically coupled mobile phase container and, on the other hand, one or more mobile phase consuming units (for example a fluid drive) of a sample separation apparatus.

In the context of the present application, the term “normally closed device” may particularly denote a device (in particular a cap device and/or a port device) having a default configuration which disables a fluid flow through said device. However, such a normally closed device may be configured to be convertible, by a predefined operation, into an opened configuration which enables a fluid flow through said device. For instance, a normally closed device may have a valve which is fluidically opened only when being controlled correspondingly, whereas it is fluidically closed in the absence of a control. With the described normally closed configuration, both the cap device and the port device are (in particular container-sided and separation-sided) sealed in a fluid tight way in their default configuration. This may be achieved by appropriate sealing measures and biasing forces (in particular spring forces, magnetic forces and/or electromechanical forces) which always act in sealing direction to thereby promote sealing, and which can only be overcome by dedicated operation forces (such as a muscle force of a user).

In the context of the present application, the term “establishing a mechanical connection between cap device and port device” may particularly denote an action of mechanically coupling cap device and port device with each other so that cap device and port device form a connected, but disconnectable, unity or integral body. For instance, establishing a mechanical connection between cap device and port device may be accomplished by establishing a form closure between cap device and port device.

In the context of the present application, the term "sample separation apparatus" may particularly denote any apparatus which involves the transport, analysis or processing of fluids for separation of a fluidic sample. A fluid may denote a liquid, a gas or a combination of a liquid and a gas, and may optionally also include solid particles, for instance forming a gel or an emulsion. Such a fluid may comprise a mobile phase (such as a fluidic solvent or solvent composition) and/or a fluidic sample under analysis. Examples for sample separation apparatuses are chemical analysis devices, life science apparatuses or any other biochemical analysis system such as a separation device for separating different components of a sample, particularly a liquid chromatography device, more particularly an HPLC. For example, the sample separation can be done by chromatography or electrophoresis.

In the context of the present application, the term "fluidic sample" may particularly denote a medium containing the matter which is actually analyzed (for example a biological sample, such as a protein solution, a pharmaceutical sample, etc.).

In the context of the present application, the term "mobile phase" may particularly denote a fluid (in particular a liquid) which serves as a carrier medium. More specifically, a mobile phase may be configured for transporting a fluidic sample between a fluid drive (such as a high pressure pump) to a sample separation unit (such as a chromatographic column) of a sample separation apparatus. For example, the mobile phase may be a (for example, organic and/or inorganic) solvent or a solvent composition (for example, water and ethanol).

In the context of the present application, the term "fluid drive" may particularly denote an entity capable of driving a fluid (i.e. a liquid and/or a gas, optionally comprising solid particles), in particular the fluidic sample and/or the mobile phase. For instance, the fluid drive may be a pump (for instance embodied as piston pump or peristaltic pump) or another source of pressure. For example, the fluid drive may be a high-pressure pump, for example capable of driving a fluid with a pressure of at least 100 bar, in particular at least 1000 bar.

The term "sample separation unit" may particularly denote a fluidic member through which a fluidic sample is transferred, and which is configured so that, upon conducting the fluidic sample through the separation unit, the fluidic sample will be separated into different groups of molecules or particles. An example for a sample separation unit is a liquid chromatography column which is capable of trapping or retarding and selectively releasing different fractions of the fluidic sample. In particular, a sample separation unit may be a tubular body with an aspect ratio (i.e. a ratio between length and diameter) of more than one, in particular of more than two, for instance even at least three.

According to an exemplary embodiment of the invention, supply of mobile phase for a sample separation apparatus can be accomplished by a cooperating cap device and port device. The cap device may be a cap or lid to be fluidically coupled with a mobile phase container, such as a solvent bottle, but may be normally closed so as to disable flow of mobile phase out of the mobile phase container in its default configuration. This normally closed configuration of the cap device protects the user against contamination with aggressive mobile phase from a connected mobile phase container. The port device may function as a fluidic interface between the cap device with fluidically connected mobile phase container on the one hand and a mobile phase flow path of the sample separation apparatus on the other hand. Also the port device may be normally closed so as to disable flow of mobile phase into the sample separation apparatus unless expressively opened. Such a normally closed configuration of the port device may protect the sample separation apparatus against undesired contamination with foreign materials (such as dust or debris) and against undesired evaporation of mobile phase out of an exposed conduit. Highly advantageously, both the cap device and the port device may be simultaneously converted from the normally closed configuration in a fluidically opened configuration by merely mechanically connecting them with each other. Thus, all a user has to do to initiate a mobile phase supply is to carry out an intuitive mechanical connection procedure, for instance by merely plugging cap device and port device together. By the described configuration, a high degree of user convenience as well as a reliable protection against contamination with mobile phase may be achieved. Advantageously, solvent transfer between mobile phase container, cap device and port device may be controlled in a simple way and with high operational safety. Exemplary embodiments of the invention may enable a handling of mobile phase containers even above head with high operational safety, and in particular without a risk of mobile phase dropping or evaporation out of a mobile phase container. Advantageously, exemplary embodiments of the invention may render a handling of tubing at mobile phase containers dispensable, since mobile phase container handling can be rendered tubeless for a user. Advantageously, any tubing may be connected permanently to the port device, rather than to the cap device. Further advantageously, configuring the cap device with a normally closed configuration not only avoids unintentional flow out of solvent from the mobile phase container, but also suppresses undesired entry of contaminations into the mobile phase container.

Next, further exemplary embodiments of the mobile phase supply device, the method, and the sample separation apparatus will be explained.

In an embodiment, the normally closed cap device may be mounted on a frame or other kind of support which may be configured so that the normally closed cap device (for instance all valves of multiple normally closed cap devices) are opened in the mounted configuration. This may make it possible to place the support with mobile phase containers and with cap devices mounted thereon into a dishwasher machine for cleaning.

In an embodiment, the port device and the cap device are configured so that, upon establishing the mechanical connection between the port device and the cap device, a fluidic path is formed (or opened) which establishes a fluid communication between the port device and the cap device, and in particular a fluidic path from the mobile phase container up to a tubing fluidically coupled to the port device. Descriptively speaking, the formation of a mechanical connection between port device and cap device may be the trigger for the opening of a previously closed fluidic path from the mobile phase container via the cap device and the port device to a fluid consuming unit (such as a fluid drive) of the sample separation apparatus. This may improve operational safety and user convenience.

In an embodiment, the cap device mounted or configured to be mounted on the mobile phase container is tubeless. In an embodiment, the mobile phase supply device comprises tubing connected only to the port device. Advantageously, exemplary embodiments of the invention may render a handling of tubing at mobile phase containers dispensable, since a mobile phase container together with a cap device handled by a user can be rendered tubeless. Advantageously, any tubing may be connected to the port device, rather than to the cap device. This improves user convenience and ensures that operation of the mobile phase supply device is simple and failure robust.

In an embodiment, the mobile phase supply device comprises a mechanical locking mechanism configured for locking the port device and the cap device upon establishing the mechanical connection between the port device and the cap device. Hence, by mechanically connecting cap device (in particular already capping a mobile phase container) and port device, they may be converted into an interlocked state. Advantageously, this avoids any unintentional separation between cap device and port device and thereby improves operational safety.

In particular, the locking mechanism may be a ball locking mechanism, or a push-to-open and push-to-close mechanism. A ball locking mechanism may create an interlocking between cap device and port device using one or more balls (for instance shaped as spheres or in another way) present in recesses between cap device and port device in a locked configuration. A push-to-open and push-to-close mechanism may for example use a guide body moving along a predefined trajectory defined by a guide recess, so that pushing the cap device towards the port device for a first time establishes an interlocked configuration between cap device and port device, whereas subsequently pushing the cap device towards the port device again will convert the interlocked configuration back into an unlocked configuration between cap device and port device.

In an embodiment, the locking mechanism is configured for being unlockable only by execution of a predefined user activity. By requiring a user to carry out a well-defined operation for unlocking, unintentional loss of interlocking between cap device and port device, for instance by unspecific vibrations or the like, may be reliably prevented.

In an embodiment, the locking mechanism is configured for locking the port device and the cap device before, during or after forming a fluidic path between the port device and the cap device. Preferably, the locking operation occurs before or during the formation of the open fluidic path. With such a configuration, it can be ensured that no fluid leakage may occur, since the fluidic path will not be opened before interlocking cap device and port device starts or is even completed.

In an embodiment, the port device and the cap device are configured so that establishing a mechanical connection between the port device and the cap device is enabled in any mutual rotational orientation between the port device and the cap device. In such a configuration, it does not matter in which mutual orientation between cap device (preferably already mounted on a mobile phase container) and port device the user initiates the mechanical connection between said two normally closed devices. Hence, operation of the mobile phase supply device is easy for a user and not prone to failure.

In an embodiment, the port device and the cap device are configured so that upon establishing a mechanical connection between the port device and the cap device, mobile phase in the mobile phase container flows towards the port device supported by the force of gravity. Thus, the geometric orientation of port device and cap device (being already mounted on a mobile phase container) may be, in a mutually connected configuration, so that the mobile phase in the mobile phase container preconnected to the cap device automatically flows under the influence of gravity from the mobile phase container through the cap device and the port device into the sample separation apparatus. The force of gravity for transporting the mobile phase may be supported, if desired or required, by an additional force, for instance provided by a fluid drive, such as a pump.

In an embodiment, the port device and the cap device are configured so that upon establishing a mechanical connection between the port device and the cap device, the mobile phase container is oriented upside down, or is oriented tilted with regard to a vertical direction. Hence, a central axis of the mobile phase container may be oriented parallel or slanted with respect to the force of gravity with the fluid outlet of the mobile phase container oriented downwardly.

In an embodiment, the port device and the cap device are configured so that before opening a fluidic path between the port device and the cap device by establishing a mechanical connection between the port device and the cap device, the fluidic path is closed by sealing measures and/or biasing forces provided by the port device and/or by the cap device. More specifically, the port device and the cap device may be configured so that closing the fluidic path before establishing the mechanical connection is accomplished by a plurality of cooperating sealing elements at the port device and at the cap device. Such sealing elements, for instance O-rings, of cap device and port device may block a flow of mobile phase from a mobile phase container connected with the cap device through the cap device and the port device until they are mechanically connected with each other. Also biasing elements, such as mechanical springs, may be provided at the normally closed devices for keeping a fluidic path closed unless the normally closed devices are mechanically interconnected with each other.

In an embodiment, the normally closed port device comprises a port biasing element, in particular a port biasing spring, configured for biasing the port device in a fluidically closed configuration unless the mechanical connection between the port device and the cap device is established. Advantageously, the port biasing element is configured for generating a biasing force oriented in a port sealing direction for biasing the port device in the fluidically closed configuration. Hence, the direction of the biasing force created and exerted by the port biasing element may be oriented in sealing direction, i.e. may promote sealing. For establishing a fluid communication between cap device and port device, the sealing port biasing force has to be overcome and overcompensated by an intentional connection force resulting from a connection of cap device and port device and exerted by a user. The biasing force created by the port biasing element and the connection force may be antiparallel to each other. The described mechanism ensures that the port device is reliably biased into the normally closed configuration.

In an embodiment, the normally closed cap device comprises a cap biasing element, in particular a cap biasing spring, configured for biasing the cap device in a fluidically closed configuration unless the mechanical connection between the port device and the cap device is established. Advantageously, the cap biasing element may be configured for generating a biasing force oriented in a cap sealing direction for biasing the cap device in the fluidically closed configuration. Hence, the direction of the biasing force created and exerted by the cap biasing element may be oriented in sealing direction, i.e. may promote sealing. For establishing a fluid communication between cap device and port device, the sealing cap biasing force has to be overcome and overcompensated by an intentional connection force created when connecting cap device and port device and exerted by a user. The biasing force created by the cap biasing element and the connection force may be antiparallel to each other. The described mechanism ensures that the cap device is reliably biased into the normally closed configuration.

In an embodiment, the cap device comprises an annular accommodation recess, in particular having an internal thread, accommodating or configured for accommodating an open mobile phase outlet of the mobile phase container, in particular having an external thread corresponding to the internal thread. For instance, the cap device can be simply attached or screwed onto an open mobile phase outlet.

In an embodiment, the cap device comprises a filter element configured for filtering mobile phase flowing from the mobile phase container through the cap device towards the port device. Such a filter element may filter debris or other foreign particles of mobile phase from the mobile phase container before being supplied into the mobile phase consuming unit(s) of the sample separation apparatus. Thereby, clogging of the mobile phase supply device and contamination of the sample separation apparatus may be reliably prevented. By integrating the filter element in the cap device, a separate handling of a filter by a user may be advantageously avoided.

In an embodiment, the cap device comprises a vent valve configured for automatically venting the mobile phase container in the event of a negative pressure in the mobile phase container for at least partially compensating the negative pressure, in particular a negative pressure due to a flow of mobile phase towards the port device. When mobile phase flows from the mobile phase container through the cap device and the port device into the sample separation apparatus, a negative pressure may be created in the mobile phase container. Such a negative pressure in the mobile phase container may have the tendency that additional flow of mobile phase from the mobile phase container towards the sample separation apparatus is inhibited. In order to avoid this, an under pressure protection may be implemented in form of a vent valve in the cap device which automatically opens when a pressure difference between an interior and an exterior of the mobile phase container exceeds a predefined threshold value. This ensures a continuous supply of mobile phase with constant flow rate.

In an embodiment, the port biasing device comprises a face body mounted movably in a stationary carrier body and configured for being moved by a facing surface of a main body the cap device upon establishing the mechanical connection between the port device and the cap device. In particular, the face body may be mounted within the stationary carrier body in an axially displaceable way. When the cap device is connected with the port device, the cap device may axially displace the face body. Advantageously, this motion may also trigger formation of an interlocking between cap device and port device.

In an embodiment, the face body and the facing surface of the cap device are shaped to form one of the group consisting of a flat face coupling, and a cone-type coupling. In case of a flat face coupling, two opposing parallel flange faces of cap device and face body may abut each other along a planar contact area. A flat face coupling is a mechanically particularly simple solution. When a cone-type coupling is established, two cone-shaped surfaces of cap device and face body may be brought in contact with each other, wherein an opening angle of the cones may be the same or may be slightly different from each other. A cone-type coupling has the advantage of a self-centering between cap device and port device.

In an embodiment, the face body has a through hole through which a stationary pin and a movable sleeve surrounding the pin extend. The sleeve may be configured for moving relatively to the pin upon establishing the mechanical connection between the port device and the cap device to thereby form at least part of a fluidic path in a gap (in particular a circumferential gap) between the pin and the sleeve for enabling a flow of mobile phase from the cap device to the port device along the fluidic path. The pin may remain spatially fixed in the port device when the cap device is mechanically connected to the port device. For example, the pin may comprise a cylindrical section with a connected frustoconical end which tapers towards the cylindrical section. The sleeve may surround the pin coaxially forming a gap in between. When the cap device is moved towards the port device for mechanically connecting them, the cap device may press the sleeve downwardly while the pin remains stationary fixed. Thereby, the frustoconical end of the pin may apply a force to a movable die of the cap device to open the fluidic path in the cap device. Since the sleeve may be movable by the impact of the cap device during the cap-port connection motion, an axial motion of the sleeve relatively to the stationary pin opens an annular flow path corresponding to the gap between pin and sleeve, thereby opening the fluidic path in the port device.

In an embodiment, the port device comprises a locking sleeve, a locking biasing element biasing the locking sleeve towards the cap device, and at least one locking body being guidable by the locking sleeve and being radially movable into a locking recess in a lateral surface of the cap device for locking the port device and the cap device upon establishing the mechanical connection between the port device and the cap device. The locking sleeve may circumferentially surround the above-mentioned stationary carrier body. The locking biasing element(s) may for instance be embodied as at least one mechanical spring (such as a helical spring) arranged between the stationary carrier body (functioning as a stationary bearing for the locking biasing element) and the locking sleeve, thereby forming a biasing force pressing the locking sleeve upwardly towards the cap device. The one or more locking bodies may for instance be balls (such as spheres) or other bodies positioned in recesses in the locking sleeve and the stationary carrier body and abutting against a lateral surface of the face body when the cap device and the port device are not connected. Upon connecting cap device and port device, the cap device will press the face body downwardly until a locking recess at a lateral surface of the cap device is engaged by the one or more locking bodies. This triggers locking.

In an embodiment, the port device comprises a stand for standing on a ground. Such a stand or base body may be placed on a ground on which the mobile phase supply device is installed. A functional part of the port device having an accommodation volume for accommodating part of the cap device in the connected configuration may protrude vertically beyond the stand and may thereby define a mutual vertical position between bottom-sided port device and top-sided cap device on which a mobile phase container may be mounted in an upside down orientation. Tubing may extend at a bottom-sided fluid outlet in the port device through the stand towards a mobile phase consuming unit of the sample separation apparatus.

In an embodiment, the port device and the cap device are configured in such a way that, upon releasing the mechanical connection between the port device and the cap device (i.e. when separating the previously connected cap and port devices), both the port device and the cap device automatically return into the fluidically closed configuration. Hence, the biasing forces created by the above-mentioned cap biasing element and port biasing element may have such an orientation that, when cap device and port device are mechanically disassembled from each other, both the cap device and the port device return, without additional user action, into their normally closed configurations. This self-sufficient mechanism may contribute to user convenience and operational safety.

In an embodiment, the above described configurations of cap device and port device may also be exchanged, so that elements described for the cap device may be implemented in the port device, and vice versa.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com).

One embodiment of a sample separation apparatus comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The sample separation unit of the sample separation apparatus preferably comprises a chromatographic column (see for instance en.wikipedia.org/wiki/Column_chromatography) providing a stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated efficiently. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

A fluidic sample analyzed by a sample separation apparatus according to an exemplary embodiment of the invention may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. For example, a fluorescence detector may be implemented.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
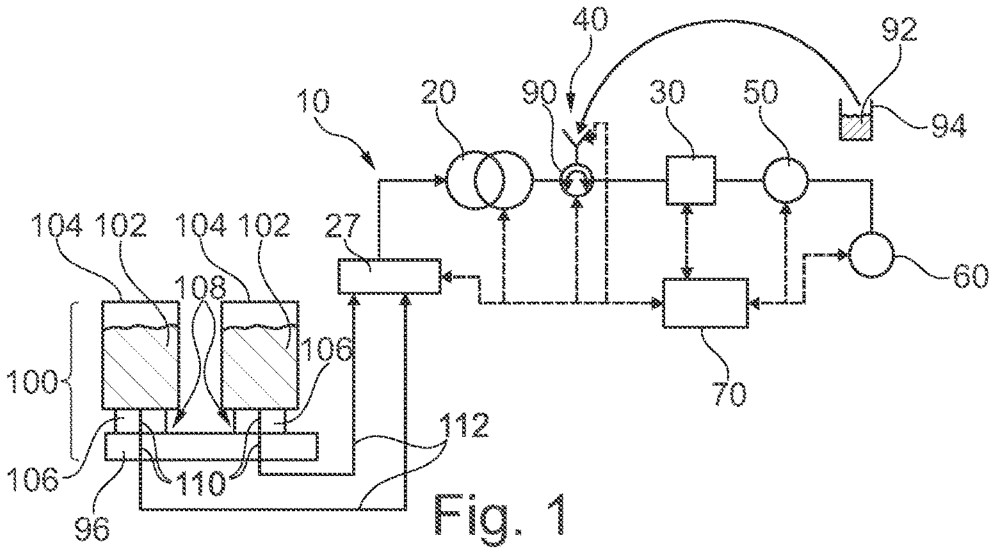
FIG. 1 shows a liquid sample separation apparatus in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

Conventionally, liquid chromatography instruments use solvent bottles which are usually located on top of the instrument, connected by solvent lines passing through openings in the caps of the bottles. Other solutions include hanging bottles. A filter is usually connected to the solvent line end that is in the mobile phase. Balances may be used to place the bottles thereon for monitoring bottle fill levels. Another solution is a system of hydrostatic pressure sensors on an additional tubing line to measure the filling level.

However, conventional solutions suffer from several disadvantages: Firstly, there is a risk of contaminating the mobile phase when touching the tubing lines or filter to put it into the bottle. Furthermore, there is a risk of splashing solvents, leading to a safety issue, when not touching the tubing lines or filter while taking it out of the bottle. Also an undesired dripping of solvents may occur when taking solvent lines out of bottles. Apart from this, contamination of solvent lines and filters may happen when putting them aside before reconnecting them. Furthermore, only bottles with threads compatible to caps can be connected. Beyond this, a distance between bottle cap and filter has to be adjusted conventionally, when using bottles of different heights. This, in turn, involves a risk of contamination, and a risk of running out of solvent, even if a bottle is still not empty, when the filter is not at the bottom of bottle. Another conventional issue is that solvent line and bottle handling above head height may be required, which may be both uncomfortable for a user and potentially unsafe. Another conventional shortcoming of mobile phase supply devices is that solvent lines can be easily mixed up by a user. When air enters into the solvent line because the solvent runs out, a liquid chromatography sample separation apparatus has to be stopped and the air has to be removed, before the sample separation apparatus can be used again. Conventionally, solvents cannot be used until the bottles are completely empty. Solvent left in the bottle has to be disposed manually, which is time consuming and can cause exposure to biohazard solvent vapors. Furthermore, a fill level monitoring can be compromised by tension of the solvent lines connected to the bottles.

In order to overcome the above-mentioned and/or other shortcomings of conventional systems, an exemplary embodiment of the invention provides a mobile phase supply device which is composed of two mutually mechanically connectable fluidically normally closed devices, i.e. a cap device and a port device. The cap device may be mounted on an outlet of a mobile phase container and may disable flow out of mobile phase from the mobile phase container in its standard or default configuration. The port device may function as a fluid interface member to be interposed between cap device and a fluid consuming unit of a sample separation apparatus to which the mobile phase is to be supplied. Also the port device may disable flow through it in its default or standard configuration to thereby protect the sample separation apparatus against contamination. Advantageously, cap device and port device may be configured correspondingly so that a mutual mechanical connection between them does not only establish a mechanical coupling but also triggers a fluidic coupling between them. In other words, the formation of a mechanical connection between cap device and port device may simultaneously convert the normally closed valve configurations of both cap device and port device into an open valve configuration. Such a mobile phase supply device offers a high degree of operational safety while being operable by a user in a very convenient way.

In a preferred embodiment, the described mobile phase supply device may create an upside-down mobile phase bottle connection, for instance to a liquid chromatography sample separation apparatus. In others word, when a mechanical connection is established between the cap device—mounted on a mobile phase container—and the port device—which may be fluidically coupled to one or more fluid consuming units (such as a fluid drive) of a sample separation apparatus—the mobile phase container may be oriented in an upside-down fashion. Thus, the force of gravity may at least contribute to drive mobile phase from the mobile phase container through the cap device and the port device further into the sample separation apparatus. Advantageously, no solvent lines need to be handled by a user operating a mobile phase supply device according to an exemplary embodiment of the invention. Hence, the latter may be easy-to-use.

Advantageously, an exemplary embodiment of the invention may allow to connect a mobile phase container (such as a solvent bottle) to the sample separation apparatus without the need to deal with solvent lines. More specifically, an exemplary embodiment of the invention may enable a tube free handling of solvent bottles. A corresponding mobile phase supply device may include a bottle cap device that connects to the bottle opening and a port device functioning as a receiving port to take up the bottle with the cap device.

Exemplary embodiments of the invention have advantages: In particular, there may be no more any risk of dripping or splashing of solvents due to solvent lines. Furthermore, contamination of the solvents during connecting them to the sample separation apparatus may be reliably prevented. Furthermore, incompatibilities due to different bottle openings may be avoided as well. Beyond this, issues caused by solvent line tension, when using balances to monitor the bottle fill levels, may be relaxed or even eliminated. Apart from this, there are no more any storage issues of additional tubing lines when bottles are not attached. Handling of solvent lines by a user may become dispensable. Furthermore, a mobile phase supply device according to an exemplary embodiment of the invention may enable a quicker, easier and safer operation compared to conventional approaches. A cap device according to an exemplary embodiment may be always compatible with a corresponding receiving port of the port device. In particular, exemplary embodiments of the invention may render a one-handed connection and/or disconnection possible, when appropriate bottles are used. Furthermore, mobile phase (such as solvents) in the mobile phase container can be used until the end, i.e. until the mobile phase container is entirely empty. This is promoted by the possible upside down configuration of a mobile phase container. Advantageously, empty bottles can be replaced with new ones, without stopping operation of the sample separation apparatus (i.e. on-the-fly). Exemplary embodiments of the invention may also offer the opportunity to empty solvent bottles into a waste can, connected to the sample separation apparatus, before removing them from the sample separation apparatus.

Embodiments may use different versions of the cap device, so that it can be connected to mobile phase containers (such as solvent bottles) with different thread dimensions.

Advantageously, the cap device may be connected to the mobile phase container (in particular a solvent bottle) tightly and/or in a sealed way, so that no mobile phase drips when turning the mobile phase container upside-down to connect it to the port device. The cap device may be opened to allow a solvent flow from the solvent container to the sample separation apparatus only when connected to the port device. When disconnecting the cap device from the port device, the cap device closes again. Optionally, a balance can be included in the receiving port device, to monitor the fill level of mobile phase in the mobile space container. Other fill level monitoring units may also be used for fill level monitoring of a sample container in other embodiments.

Additionally, several port devices can be provided in a mobile phase supply device so it does not matter in which port device the mobile phase container with attached cap device is attached to, as there may be a valve (or any other functionally similar unit) to select and distribute the right mobile phase (in particular solvent) to the sample separation apparatus. Advantageously, it may be possible that the user adds as many port devices as needed for a specific application.

Advantageously, an embodiment of the invention allows to connect a solvent bottle to the instrument without the need to deal with solvent lines. A corresponding mobile phase supply device may include a bottle cap device that connects to the bottle opening and a receiving port device to take up the bottle with the cap device thereon. Preferably, the bottle may be oriented upside-down or may be tilted. All necessary tubing may be mechanically connected to the port device, whereas the cap device may be free of tubing.

A gist of an exemplary embodiment of the invention is to couple a mobile phase container (such as a solvent bottle) upside down to a sample separation apparatus (such as an HPLC system) using a cap device and a port device cooperating with each other. In a preferred embodiment, it may be possible to mechanically couple and hold the mobile phase container upside down (i.e. with its fluid outlet oriented downwardly) to the sample separation apparatus. In a preferred embodiment, establishing the mechanical coupling between cap device and port device may self-sufficiently establish a fluidic coupling from the mobile phase container via the cap device and the port device up to a mobile phase consuming unit of the sample separation apparatus. In a preferred embodiment, it may also be possible to provide an air ventilation of the mobile phase container through the cap device based on an under pressure in the mobile phase container which leads to an air flow through a dedicated vent valve, which may be otherwise closed.

Advantageously, an exemplary embodiment of the invention provides a mobile phase supply device connecting one or more of mobile phase containers (such as solvent bottles) upside down to a sample separation apparatus (such as an HPLC instrument) using one or more dedicated port devices at the sample separation apparatus and in a respective cap device for capping a respective mobile phase container as well. Advantageously, establishing a corresponding fluid connection may be performed with a leakage-free attaching and detaching of the bottles. An exemplary embodiment of the invention provides a cap device for capping a mobile phase container, wherein a user just presses or clicks or screws the inverted mobile phase container capped with the cap device into a correspondingly configured port device at the sample separation apparatus, but nothing else. All tubing connections may reside in the sample separation apparatus (for instance underneath its housing), so that any handling of tubing by a user may be avoided.

In one embodiment, the port device may comprise a stand or base plate, a spring-loaded pressure plate, and a receptor with integrated guideways for a push-push mechanism. The cap device, which may function as a bottle closure, may comprise a bottle lid for screwing on with internal seals to the neck of the bottle and inside. Also an internal solvent filter may be formed in the cap device. A ring (which may be freely rotatable about 360°) may be provided with guide pin for insertion in guideways of a receptor of the port device. Advantageously, a fluid coupling may be established between port device and cap device triggered by establishing a mechanical connection between port device and cap device.

During operation of such an embodiment, a user may place a mobile phase container capped by the cap device on the port device. The cap device and the port device may be designed in such a way that the positioning of guide pins is self-adjusting and the user does not have to pay attention to a certain orientation between mobile phase container, cap device and port device. The user may push the capped mobile phase container into the port device until the capped mobile phase container stops. By this action of mechanically connecting cap device and port device, the actual fluid connection can be automatically established in a sealed fashion. As soon as the user releases the mobile phase container, the guide pins may be pressed against a defined stop by the spring-loaded pressure plate. By pressing the mobile phase container again, the guide pins move into a new guide path, so that the mobile phase container can then be pulled out upwardly without resistance. Furthermore, with exactly this movement sequence, the fluid connection will be interrupted simultaneously in a defined manner, so that a drip-free and leak-proof removal of the bottle occurs.

Still referring to the previously described embodiment, the port device may provide all fluid connections (for instance with solvent, air, etc.). Tubes may be firmly connected to the port device, and may be interchangeable for instance for maintenance or repair. Multiple port devices can be arranged individually or can also be connected to each other in a detachable or integrally connected manner (for instance depending on the available space and the installation situation).

Referring now in greater detail to the drawings, FIG. 1 depicts a general schematic of a liquid separation system as example for a sample separation apparatus 10 according to an exemplary embodiment of the invention. A fluid drive 20 (such as a piston pump) receives a mobile phase 102 from a mobile phase supply device 100 via degassing unit 27, which degases and thus reduces the amount of dissolved gases in the mobile phase 102. The fluid drive 20 drives the mobile phase 102 through a separation unit 30 (such as a chromatographic column) comprising a stationary phase. Hence, fluid drive 20 can be considered as a mobile phase consuming unit. A sampler or injector 40, implementing a fluidic valve 90, can be provided between the fluid drive 20 and the separation unit 30 in order to subject or add (often referred to as sample introduction) a fluidic sample 92, which may be stored in a sample container 94 (such as a vial), into the mobile phase 102. Thus, fluidic sample 92 and mobile phase 102 may be provided towards a separation path where actual sample separation occurs. The stationary phase of the separation unit 30 is configured for separating compounds of the fluidic sample 92. A detector 50 is provided for detecting separated compounds of the fluidic sample 92. A fractionating unit 60 can be provided for outputting separated compounds of sample fluid. It is also possible to provide a waste (not shown).

While the mobile phase 102 can be comprised of one solvent only, it may also be mixed from plural solvents. Such mixing may be a low pressure mixing and provided upstream of the fluid drive 20, so that the fluid drive 20 already receives and pumps the mixed solvents as the mobile phase 102. Alternatively, the fluid drive 20 may comprise plural individual pumping units, with plural of the pumping units each receiving and pumping a different solvent or mixture, so that the mixing of the mobile phase 102 (as received by the separation unit 30) occurs at high pressure and downstream of the fluid drive 20 (or as part thereof). The composition of the mobile phase 102 may be kept constant over time, the so called isocratic mode, or varied over time, the so called gradient mode.

A data processing unit or control unit 70, which can be a PC or workstation, and which may comprise one or more processors, may be coupled (as indicated by the dotted arrows) to one or more of the devices in the sample separation apparatus 10 in order to receive information and/or control operation. For example, the control unit 70 may control operation of the fluid drive 20 (for example setting control parameters) and receive therefrom information regarding the actual working conditions (such as output pressure, etc. at an outlet of the pump). Optionally, the control unit 70 may also control operation of the mobile phase supply device 100 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the fluid drive 20). The separation unit 30 may also be controlled by the control unit 70 (for example selecting a specific flow path or column, setting operation temperature, etc.), and send—in return —information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provide data back.

Next, construction and operation of the mobile phase supply device 100 supplying mobile phase 102 to the fluid drive 20 of the sample separation apparatus 10 for separating the fluidic sample 92 will be explained. In the shown embodiment, two mobile phase containers 104, each filled with a respective mobile phase 102, are provided and fluidically connected in the sample separation apparatus 10. Each of the mobile phase containers 104 may be a solvent bottle filled with a respective solvent, constituting the respective mobile phase 102. Each of the mobile phase containers 104 is arranged upside down according to FIG. 1, i.e. with its open fluid outlet orientated downwardly.

Furthermore, the mobile phase supply device 100 comprises two fluidically normally closed cap devices 106, each mounted on a respective one of the mobile phase containers 104 containing the respective mobile phase 102. Since each cap device 106 is normally closed when being unconnected from a below described assigned port device 108, a respective cap device 106 screwed on an open fluid outlet of a respective mobile phase container 104 seals the mobile phase container 104 and disables a flow of mobile phase 102 out of the mobile phase container 104. More specifically, each cap device 106 may be sealingly screwed on a respective open fluid outlet of an assigned mobile phase container 104. As a result, each mobile phase container 104 is prevented from an undesired flow of mobile phase 102 through the open fluid outlet in the upside down configuration of the mobile phase container 104 thanks to the normally closed configuration of the sealingly mounted cap device 106.

Furthermore, two fluidically normally closed port devices 108 are provided in the mobile phase supply device 100 according to FIG. 1, each assigned to a respective cap device 106 and configured for being mechanically connected with the assigned cap device 106. Since the port devices 108 are normally closed devices, they are fluidically sealed when not being assembled with an assigned cap device 106. However, upon establishing a mechanical connection between a respective port device 108 and an assigned cap device 106, each of the port device 108 and the cap device 106 of a cap-and-port assembly are converted into a fluidically opened configuration. Thus, when a cap device 106, with a mobile phase container 104 mounted thereon, is mechanically connected with the assigned port device 108, both cap device 106 and port device 108 are simultaneously and automatically transformed or converted into a fluidically opened configuration so that a continuous fluidic path 110 is established from an interior of the mobile phase container 104 through the assembled cap device 106, the connected port device 108 up to tubing 112 which fluidically couples the port device 108 with the degassing unit 27 and subsequently with the fluid drive 20. In the shown embodiment, both port devices 108 are integrally formed as a common support body 96, but may also be configured as separate bodies.

Advantageously, no tubing 112 has to be handled by a user when assembling or exchanging mobile phase containers 104. Any contact between the user and mobile phase 102 (which may be an aggressive chemical) may be reliably prevented, even when the mobile phase containers 104 are handled above a head of the user and are oriented upside down. All a user has to do for fluidically coupling the mobile phase containers 104 to the sample separation apparatus 10 is to screw a cap device 106 on an open fluid outlet of a mobile phase container 104 and to mechanically plug the cap device 106 with assembled mobile phase container 104 on a port device 108, which automatically establishes a fluidic connection by opening the previously closed fluidic path 110.

For changing an empty mobile phase container 104, the user mechanically disconnects the empty mobile phase container 104 together with the connected cap device 106 from the assigned port device 108, whereby the fluidic path 110 is closed and both the cap device 106 and the port device 108 return to their normally closed fluid tight configuration. After having turned around the mobile phase container 104 with the still connected cap device 106 so that the open fluid outlet of the mobile phase container 104 is oriented upwardly, the user can remove the cap device 106 from the mobile phase container 104. The user may then refill the empty mobile phase container 104 with mobile phase 102 or may use a fresh mobile phase container 104 containing mobile phase 102, and connect the cap device 106 to the respective mobile phase container 104. The described process of assembly and disassembly may then be repeated, for instance once or several times.

Figure 2:
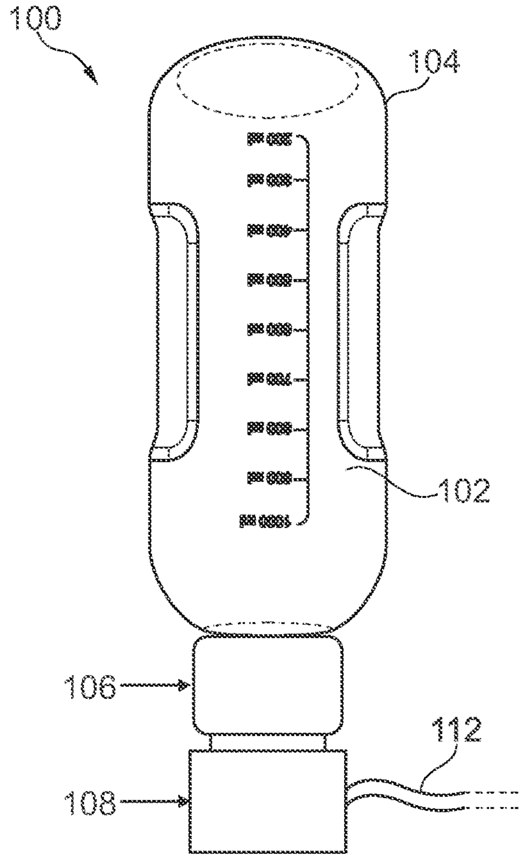
FIG. 2 shows a scheme of a mobile phase supply device according to an exemplary embodiment.

FIG. 2 shows a scheme of a mobile phase supply device 100 according to an exemplary embodiment.

More specifically, FIG. 2 shows a mobile phase container 104 embodied as glass or plastic bottle and filled with mobile phase 102, such as an organic solvent. The open fluid outlet of the mobile phase container 104 is closed by a cap device 106. After turning the mobile phase container 104 upside down, the cap device 106 may be plugged into the port device 108 for establishing a mechanical connection and simultaneously a fluidic connection between the mobile phase 102 in the interior of the mobile phase container 104, the cap device 106, the port device 108, and tubing 112 being fluidically connected to the port device 108.

Figure 3:
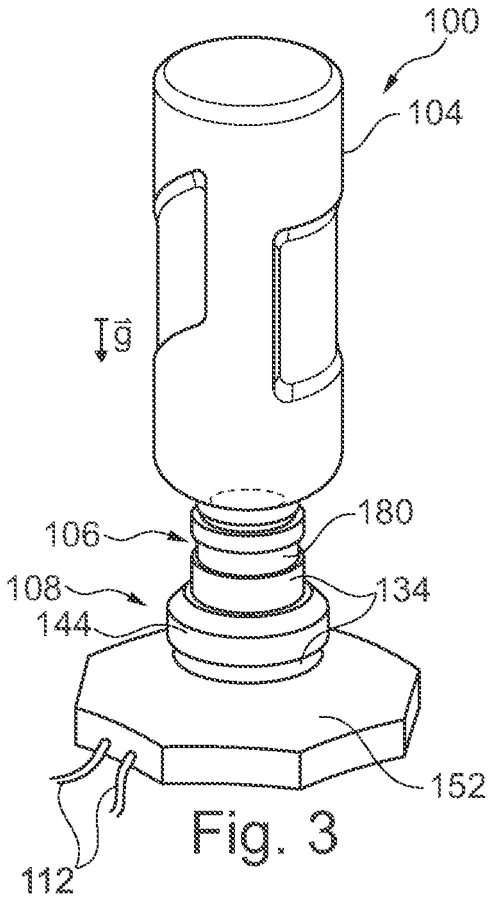
FIG. 3 shows a three-dimensional view of a mobile phase supply device according to an exemplary embodiment.
Figure 4:
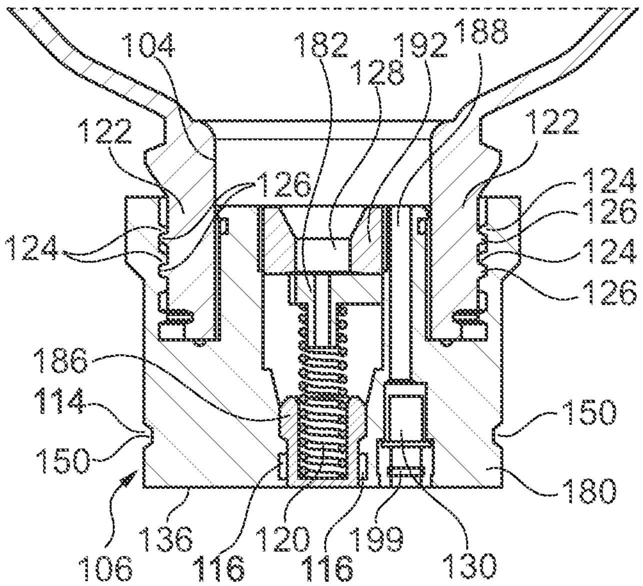
FIG. 4 shows a cross-sectional view of a cap device of the mobile phase supply device according to FIG. 3.
Figure 5:
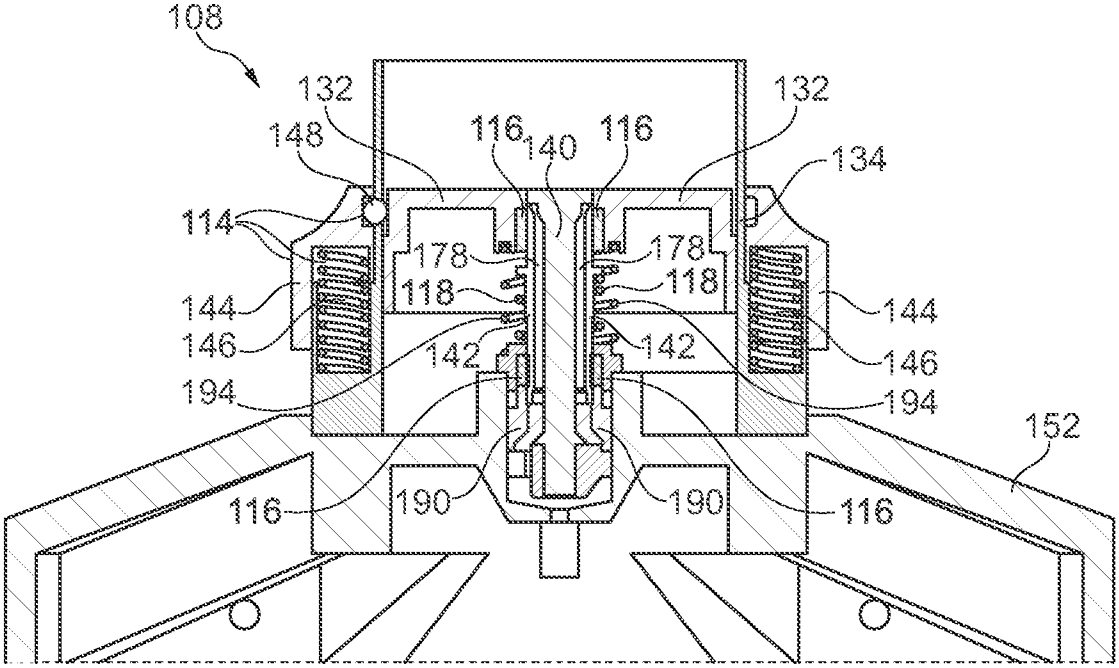
FIG. 5 shows a cross-sectional view of a port device of the mobile phase supply device according to FIG. 3 and FIG. 4.

FIG. 3 shows a three-dimensional view of a mobile phase supply device 100 according to an exemplary embodiment. FIG. 4 shows a cross-sectional view of a cap device 106 of the mobile phase supply device 100 according to FIG. 3. FIG. 5 shows a cross-sectional view of a port device 108 of the mobile phase supply device 100 according to FIG. 3.

The mobile phase supply device 100 according to FIG. 3 to FIG. 5 serves for supplying a mobile phase 102, such as an organic solvent, to a sample separation apparatus 10, such as a liquid chromatography device. The sample separation apparatus 10 may be configured for example according to FIG. 1 and may be capable of separating a fluidic sample 92. For this purpose, mobile phase 102 may be used as a carrier medium for carrying the fluidic sample 92, as described above.

Again referring to FIG. 3, the mobile phase supply device 100 comprises fluidically normally closed cap device 106 which is detachably mounted in a liquid tight manner on mobile phase container 104, such as a solvent bottle which may be made of glass, containing the mobile phase 102. As a further constituent, the mobile phase supply device 100 comprises fluidically normally closed port device 108 configured for being mechanically connected with the cap device 106. While each of the cap device 106 and the port device 108 does not have an open continuous flow path in its interior and is therefore in a fluidically closed configuration when being disassembled from each other, both the port device 108 and the cap device 106 are converted into a fluidically opened configuration by merely establishing a mechanical connection between the port device 108 and the cap device 106. In other words, each of the cap device 106 and the port device 108 is fluidically closed in its interior in their mutually disconnected configuration according to FIG. 4 and FIG. 5. However, an arrangement composed of the cap device 106 and the port device 108 connected with the cap device 106 according to FIG. 3 establishes a continuous fluidic path 110 from an interior of the mobile phase container 104 through the cap device 106 and through the port device 108. Hence, the port device 108 and the cap device 106 are configured so that, upon establishing the mechanical connection between the port device 108 and the cap device 106, a continuous fluidic path 110 (see FIG. 13) is formed which establishes a fluid communication from the mobile phase container 104, through the cap device 106, through the port device 108, and up to a tubing 112 fluidically coupled to the port device 108. From the tubing 112, the fluidic connection can be continued towards further constituents of the sample separation apparatus 10, such as the degassing unit 27, fluid drive 20, etc.

Advantageously, the cap device 106 is tubeless. Thus, a user does not have to handle any tubing 112 when assembling or disassembling a mobile phase container 104 together with a cap device 106 to the sample separation apparatus 10. As shown schematically in FIG. 3 and FIG. 15, all tubing 112 of the mobile phase supply device 100 is connected to the port device 108, rather than to the cap device 106 and to the mobile phase container 104.

Moreover, the mobile phase supply device 100 comprises a locking mechanism 114 configured for automatically locking the port device 108 and the cap device 106 upon establishing the mechanical connection between the port device 108 and the cap device 106. In the embodiment of FIG. 3 to FIG. 5, the locking mechanism 114 is configured as a ball locking mechanism. Advantageously, said locking mechanism 114 is configured for being unlockable only by execution of a predefined user activity. Consequently, an unintentional disconnection of the locking mechanism 114 can be avoided. The illustrated locking mechanism 114 is configured for locking the port device 108 and the cap device 106 together, and can be activated simultaneously with the formation of fluidic path 110 between the port device 108 and the cap device 106. In other words, the mechanical connection operation for connecting cap device 106 with port device 108 may simultaneously establish an interlocking between cap device 106 and port device 108 and an opening of the fluidic path 110 in an interior of both the cap device 106 and the port device 108. This renders operation of the mobile phase supply device 100 for a user safe, simple and convenient. The locking mechanism 114 is configured as follows: As part of the locking mechanism 114, the port device 108 comprises an axially movable locking sleeve 144 surrounding a stationary carrier body 134 (which may also be denoted as coupling carrier) of the port device 108. Locking biasing elements 146, which are here configured as helical springs having a central axis corresponding to a central axis of the locking sleeve 144 and the stationary carrier body 134, bias the locking sleeve 144 into an upward orientation and thereby towards the cap device 106. Descriptively speaking, the locking biasing elements 146 (which may also be denoted as locking sleeve springs) bias the port device 108 in a defined state. In order to exert a biasing force to the locking sleeve 144 by the biasing elements 146, the stationary carrier body 134 forms a stationary bearing at a lower end of each biasing element 146. A plurality (for instance two to nine) of circumferentially distributed locking bodies 148, which are here embodied as locking balls and only one of which being shown in FIG. 5, can be guided in a recess of the locking sleeve 144 and may extend through a through hole formed in the stationary carrier body 134 to abut against a lateral surface of a face body 132 (which may also be denoted as face sleeve) of the port device 108. Face body 132 may cooperate with a face spring 194. The face body 132 is movably mounted inside of the sleeve-like stationary carrier body 134. When the cap device 106 is connected to the port device 108 by inserting a main body 180 of the cap device 106 into an accommodation volume in an interior of the stationary carrier body 134, the main body 180 presses the face body 132 downwardly so that the locking bodies 148 lose contact with the lateral surface of the face body 132, get into contact with the lateral surface of the main body 180 and finally engage into one or more locking recesses 150 in the lateral surface of the main body 180 of the cap device 106. Main body 180 may also be denoted as coupler. Locking recess (es) 150 may for instance be embodied as a circumferential groove in main body 180, or as a plurality of separate recesses. Thus, each of the locking bodies 148 can be displaced radially inwardly to engage into locking recess 150 in a lateral surface of the cap device 106 for locking the port device 108 and the cap device 106 by clamping the locking bodies 148 in between upon establishing the mechanical connection between the port device 108 and the cap device 106. Each of the locking bodies 148 may be inserted in a hole in stationary carrier body 134 and can slide radially inwardly or outwardly.

Both a bottom portion of the main body 180 of the cap device 106 and an accommodation recess in an upper portion of the stationary carrier body 134 of the port device 108 may be rotationally symmetric with respect to a vertical symmetry axis. Consequently, the port device 108 and the cap device 106 are geometrically configured so that establishing a mechanical connection between the port device 108 and the cap device 106 is enabled in any mutual rotational orientation between the port device 108 and the cap device 106. This is very convenient for a user, since the user does not have to care about the mutual rotational properties between cap device 106 and port device 108 when connecting the former with the latter.

Figure 15:
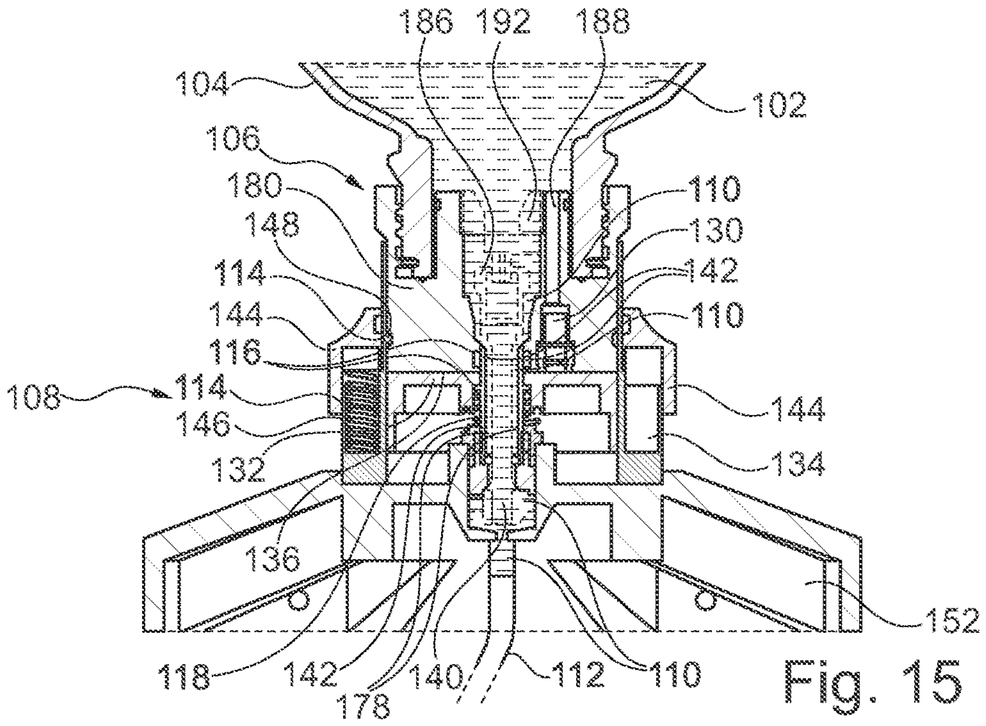
FIG. 15 shows a cross-sectional view of the cap device and the port device of the mobile phase supply device shown in FIG. 14 in the fifth operation state.

As can be taken from FIG. 3, the port device 108 and the cap device 106 are mounted vertically on top of each other and are therefore configured so that, upon establishing a mechanical connection between the port device 108 and the cap device 106, mobile phase 102 in the mobile phase container 104 flows towards the port device 108 by the force of gravity along the opened fluidic path 110 (see FIG. 15). This is promoted by the fact that the mobile phase container 104 is oriented upside down when its open fluid outlet is closed by the cap device 106 and when the cap device 106 is mechanically connected with the port device 108. The direction of the force of gravity is indicated in FIG. 3 by the g-vector.

Now referring to FIG. 4 and FIG. 5, both the port device 108 and the cap device 106 are configured so that before opening fluidic path 110 between the port device 108 and the cap device 106 by establishing a mechanical connection between the port device 108 and the cap device 106 (according to FIG. 3 and as best seen in FIG. 15), the fluidic path 110 is closed by the port device 108 and by the cap device 106. This ensures a fluid tight handling of the cap device 106 on the assigned mobile phase container 104 by a user before connecting the cap device 106 with the port device 108. Furthermore, this fluidically normally closed configuration suppresses undesired introduction of dust or other foreign particles into the sample separation apparatus 10 through the port device 108 before establishing a connection with the cap device 106. In order to guarantee a closed fluidic path 110 before establishing the mechanical connection between cap device 106 and port device 108, a plurality of cooperating sealing elements 116 are provided at the port device 108 and at the cap device 106, see FIG. 4 and FIG. 5. Referring to the cap device 106, a circumferential sealing element 116 may be formed between main body 180 and a movable die 186. Referring to the port device 108, a circumferential sealing element 116 may be formed between face body 132 and a movable sleeve 142. Moreover, a circumferential sealing element 116 may be formed between a bearing body 190 and the movable sleeve 142.

Now referring to FIG. 5, the normally closed port device 108 comprises a port biasing element 118 which is here embodied as a port biasing helical spring arranged along a central axis of the port device 108. More specifically, the port biasing element 118 surrounds both a stationary pin 140 and the movable sleeve 142 of the port device 108. The port biasing element 118 is configured for biasing the port device 108 in the fluidically closed configuration unless the mechanical connection between the port device 108 and the cap device 106 is established. In other words, the port biasing element 118 seals the port device 108 when being unconnected with the cap device 106. Advantageously, the port biasing element 118 is configured for generating a biasing force oriented in a port sealing direction for biasing the port device 108 in the fluidically closed configuration. Descriptively speaking, the port biasing element 118 forces the movable sleeve 142 into a sealed configuration with respect to pin 140 in the absence of exterior forces (i.e. exterior forces applied by the cap device 106 to the port device 108 when connecting the cap device 106 with the port device 108). At a bottom side of the port biasing element 118, bearing body 190 functions as a stationary bearing for the port biasing element 118. As a top side of the port biasing element 118, the port biasing element 118 presses the movable sleeve 142 upwardly towards the stationary pin 140 to thereby close the fluidic path 110 in the port device 108. When the cap device 106 is connected with the port device 108, main body 180 displaces face body 132 downwardly. A downwardly oriented force is then exerted to the port biasing element 118 and the movable sleeve 142 to open fluidic path 110 in port device 108 against the biasing force of the port biasing element 118. Port biasing element 118 may also be denoted as punch sleeve spring. Accordingly, movable sleeve 142 may be denoted as punch sleeve. Correspondingly, bearing body 190 may be denoted as punch sleeve guide. Below bearing body 190, a punch nut can be arranged.

As already mentioned, the port device 108 comprises the face body 132 which is mounted movably in the stationary carrier body 134 and configured for being moved by a facing front 136 of the main body 180 of the cap device 106 upon establishing the mechanical connection between the port device 108 and the cap device 106. In the shown embodiment, the face body 132 and the facing front 136 of the cap device 106 are shaped to form a flat face coupling (alternatively a cone connection may be carried out, not shown). Hence, opposing flat faces of the main body 180 and of the face body 132 are in abutment when connecting cap device 106 and port device 108. The face body 132 is provided with a central through hole through which stationary pin 140 and movable sleeve 142 (surrounding the pin 140) extend. In this context, the sleeve 142 is configured for moving relatively to the pin 140 upon establishing the mechanical connection between the port device 108 and the cap device 106 to thereby open a bottom portion of the fluidic path 110 to extend along a circumferential annular gap 178 between the pin 140 and the sleeve 142 for enabling a flow of mobile phase 102 from the cap device 106 to the port device 108.

Now referring to FIG. 4, the normally closed cap device 106 comprises a cap biasing element 120, which is here embodied as a cap biasing helical spring arranged along a central axis of the cap device 106. The cap biasing element 120 is configured for biasing the cap device 106 in a fluidically closed configuration, since a movable die 186 inside main body 180 of cap device 106 closes a fluidic connection in a default configuration unless the mechanical connection between the port device 108 and the cap device 106 is established. Cap biasing element 120 may also be denoted as die spring. The cap biasing element 120 is configured for generating a biasing force oriented in a cap sealing direction for biasing the cap device 106 in the fluidically closed configuration. Only when the cap device 106 is connected with the port device 108, the die 186 is moved upwardly relative to the main body 118 and the cap biasing element 120 is compressed by the stationary pin 140 of the port device 108 which exerts an upwardly oriented force on the movable die 186 to thereby open a top portion of the fluidic path 110 in the cap device 106. In an unconnected state of cap device 106, the die 186 seals a flow out channel from the mobile phase container 104. The cap biasing element 120 presses the die 186 downwardly and abuts against a stationary bearing at its upper end. The cap biasing element 120 is designed so that its biasing force is strong enough to prevent an undesired opening of the portion of the fluidic path 110 in the cap device 106 by a finger of a user when handling the cap device 106.

Establishing a mechanical connection between cap device 106 and port device 108 establishes simultaneously an interlocking between cap device 106 and port device 108 as well as the opening of a previously closed fluidic path 110 in both the cap device 106 and the port device 108. This is a very reliable mechanism allowing a fluid communication only upon establishing a locking engagement and being operable by a user in a very simple and intuitive way. Since the described force transmission mechanism is invertible or reversible, the port device 108 and the cap device 106 are configured in such a way that, upon releasing the mechanical connection between the port device 108 and the cap device 106, both the port device 108 and the cap device 106 automatically return into the fluidically closed configuration. In other words, when disassembling cap device 106 from port device 108, both the locking mechanism 114 will unlock and the previously established fluidic path 110 will be closed automatically.

Again referring to FIG. 4, the cap device 106 comprises an annular accommodation recess 122 having an internal thread 124. The accommodation recess 122 is shaped and dimensioned for accommodating an annular open fluid outlet of the mobile phase container 104 having an external thread 126 corresponding to the internal thread 124 of the main body 180 at the annular accommodation recess 122. Thus, the annular open fluid outlet of the mobile phase container 104 may be simply screwed in the accommodation recess 122 of the cap device 106 to establish a fluid tight connection between mobile phase container 104 and cap device 106.

As also shown in FIG. 4, the cap device 106 comprises a filter element 128 at a fluidic interface between the mobile phase container 104 and the cap device 106. The solvent filter element 128 may be for example a porous disk or cylinder inserted into a stationary filter receptor 192 and configured for filtering solid particles out of mobile phase 102 from mobile phase container 104. Below the filter receptor 192, a further stationary body 182 may be provided functioning as die limiter. When mobile phase 102 flows from the mobile phase container 104 into fluidic path 110 inside of the cap device 106, the filter element 128 will automatically filter the mobile phase 102 flowing from the mobile phase container 104 towards the port device 108 and will prevent foreign solid particles from contaminating the sample separation apparatus 10.

As also shown in FIG. 4, the cap device 106 comprises a passive vent valve 130 which is connected via a conduit 188 with an upper side of the cap device 106 to establish a fluid communication with an interior of the mobile phase container 104 when assembled on the cap device 106. The vent valve 130 is configured for automatically venting the mobile phase container 104 in the event of a negative pressure in the mobile phase container 104. Such a negative pressure may be generated inside of the mobile phase container 104 when mobile phase 102 continuously flows out of the mobile phase container 104 and into the sample separation apparatus 10. Unfortunately, such a negative pressure has a tendency of inhibiting continued flow of mobile phase 102 through the mobile phase supply device 100 into fluidically connected members of the sample separation apparatus 10. When the created negative pressure in the mobile phase container 104 exceeds a predetermined threshold value (which can be defined by the design of the vent valve 130), the vent valve 130 will automatically open for pressure equalization. Hence, by opening the vent valve 130, an interior of the mobile phase container 104 may be kept at or close to atmospheric pressure and will thereby ensure a continuous flow of mobile phase 102 out of the mobile phase container 104. Thus, the vent valve 130 may partially or entirely compensate a negative pressure in the mobile phase container 104 due to a flow of mobile phase 102 towards the port device 108. Vent valve 130 may comprise a vent valve screw 199. For example, vent valve 130 may be embodied as duckbill valve or check valve.

Figure 6:
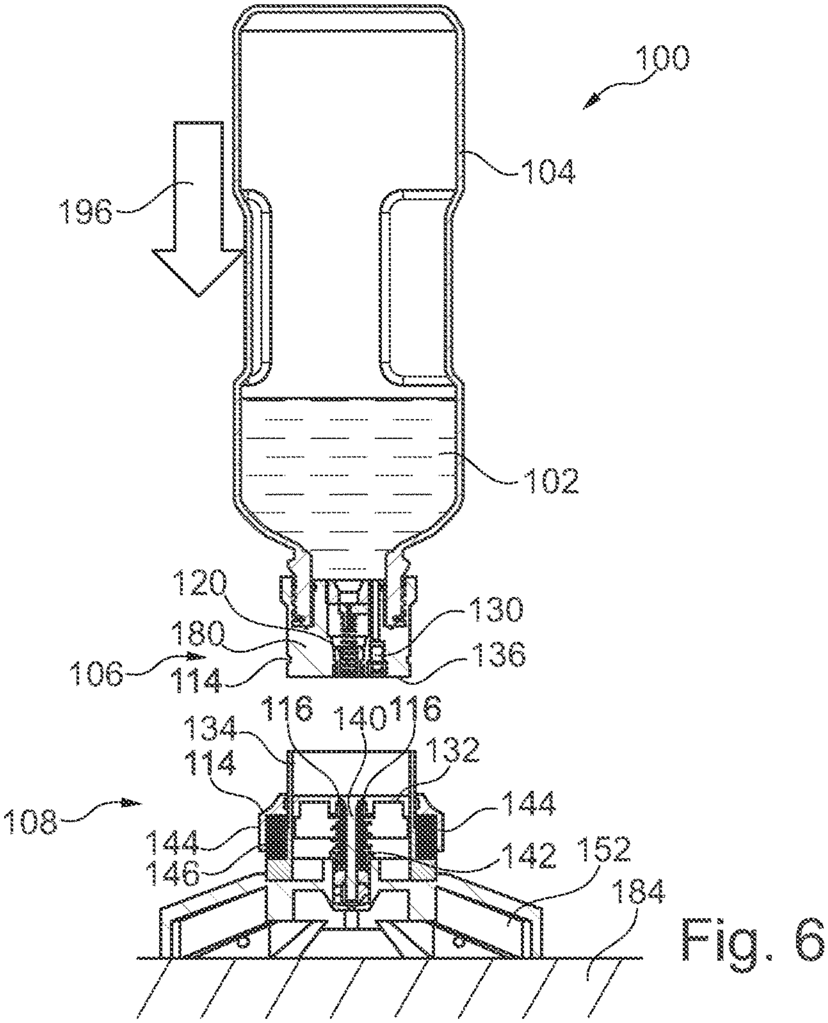
FIG. 6 shows a cross-sectional view of the mobile phase supply device according to FIG. 3 to FIG. 5 in a first operation state.

As illustrated in FIG. 3 and FIG. 5, the port device 108 comprises a stand 152 for standing on a ground (see reference sign 184 in FIG. 6). Thus, stand 152 forms a base body of the port device 108. Although not shown in FIG. 5, tubing 112 may be fluidically connected to the stand 152.

Figure 7:
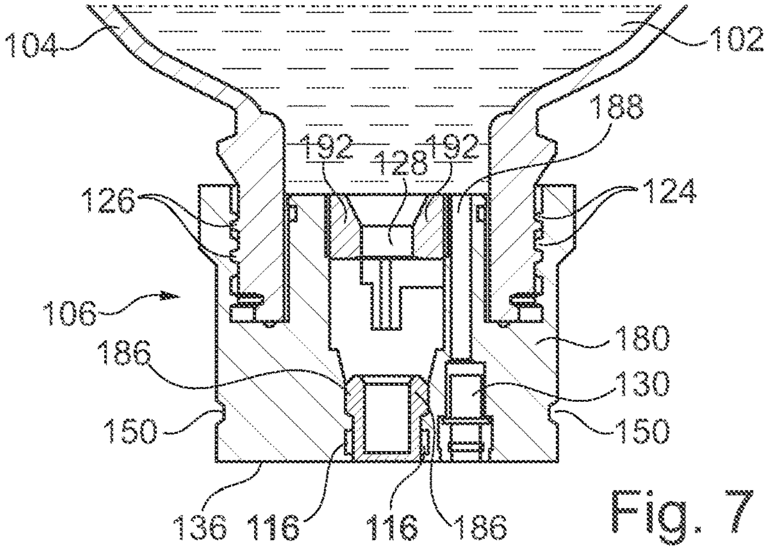
FIG. 7 shows a cross-sectional view of the cap device of the mobile phase supply device shown in FIG. 6 in the first operation state.

Referring to FIG. 6 to FIG. 15, operation of the mobile phase supply device 100 according to FIG. 3 to FIG. 5 will be explained in further detail:

FIG. 6 shows a cross-sectional view of the mobile phase supply device 100 and FIG. 7 shows a cross-sectional view of the cap device 106 of the mobile phase supply device 100 according to FIG. 3 to FIG. 5 in a first operation state.

In the configuration according to FIG. 6 and FIG. 7, the cap device 106 has been screwed on the mobile phase container 104. The port device 108 is still unconnected with respect to the cap device 106. Hence, the bottle is still out of the port, i.e. is not connected to the port. Since cap device 106 and port device 108 are both in their normally closed configuration, each of port and capped bottle are sealed. In the cap device 106, sealing is accomplished by radial sealing element 116 shown in FIG. 7.

Reference sign 196 indicates a hand force of the user who is presently approaching the mobile phase container 104, capped with the cap device 106, towards the port device 108.

Figure 8:
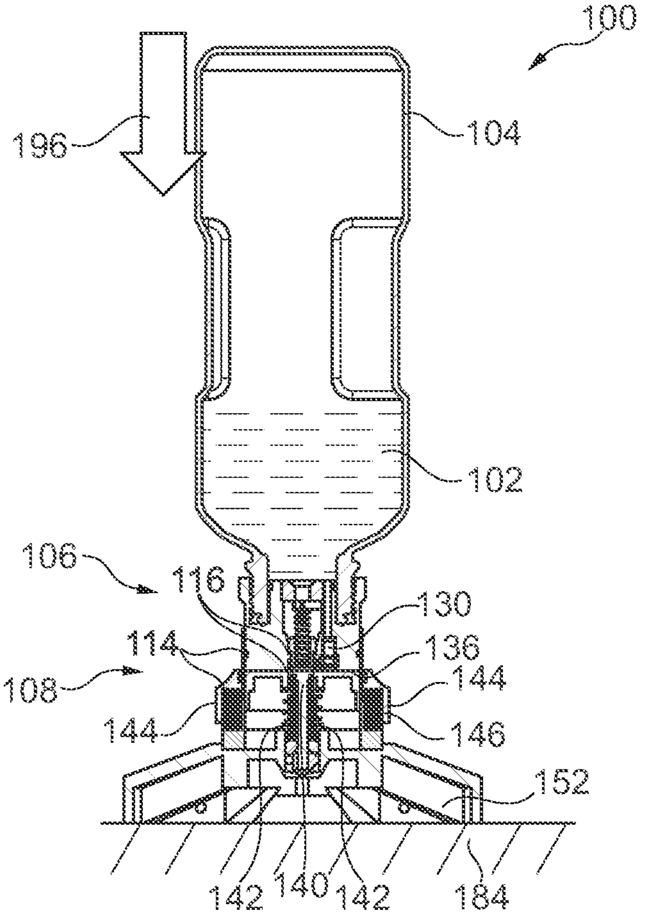
FIG. 8 shows a cross-sectional view of the mobile phase supply device according to FIG. 3 to FIG. 7 in a second operation state.
Figure 9:
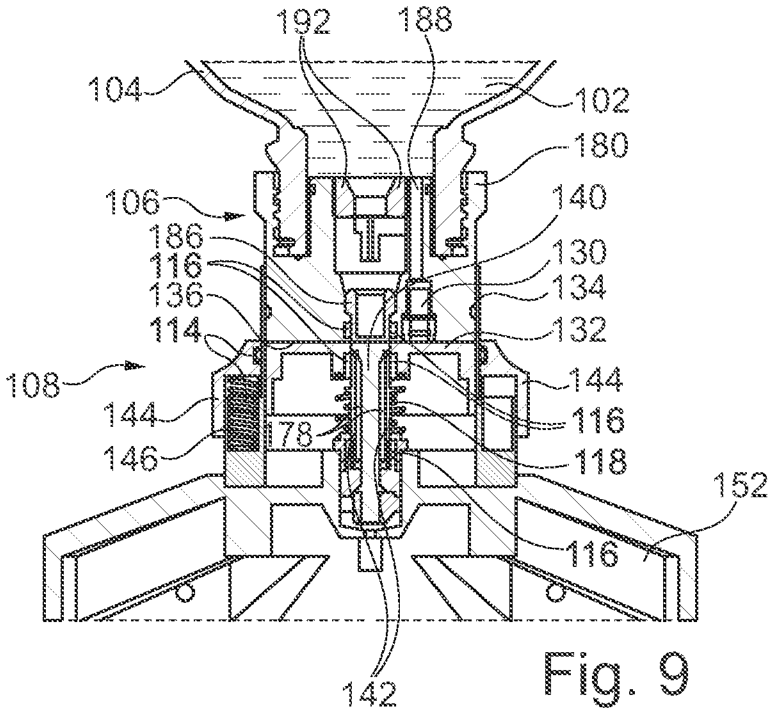
FIG. 9 shows a cross-sectional view of the cap device and the port device of the mobile phase supply device shown in FIG. 8 in the second operation state.

FIG. 8 shows a cross-sectional view of the mobile phase supply device 100 and FIG. 9 shows a cross-sectional view of the cap device 106 and the port device 108 of the mobile phase supply device 100 according to FIG. 3 to FIG. 7 in a second operation state.

In the configuration according to FIG. 8 and FIG. 9, the cap device 106 on the mobile phase container 104 is inserted into the port device 108. Thus, the capped bottle is inserted in the port, but is not yet connected to the port. Each of port and capped bottle is still fluidically sealed. Various sealing elements 116 are shown in FIG. 9, which can be embodied as O-rings. In particular, the movable punch sleeve 142 may have an exterior sealing element 116 for sealing a port-sided portion of the fluidic path 110.

Figure 10:
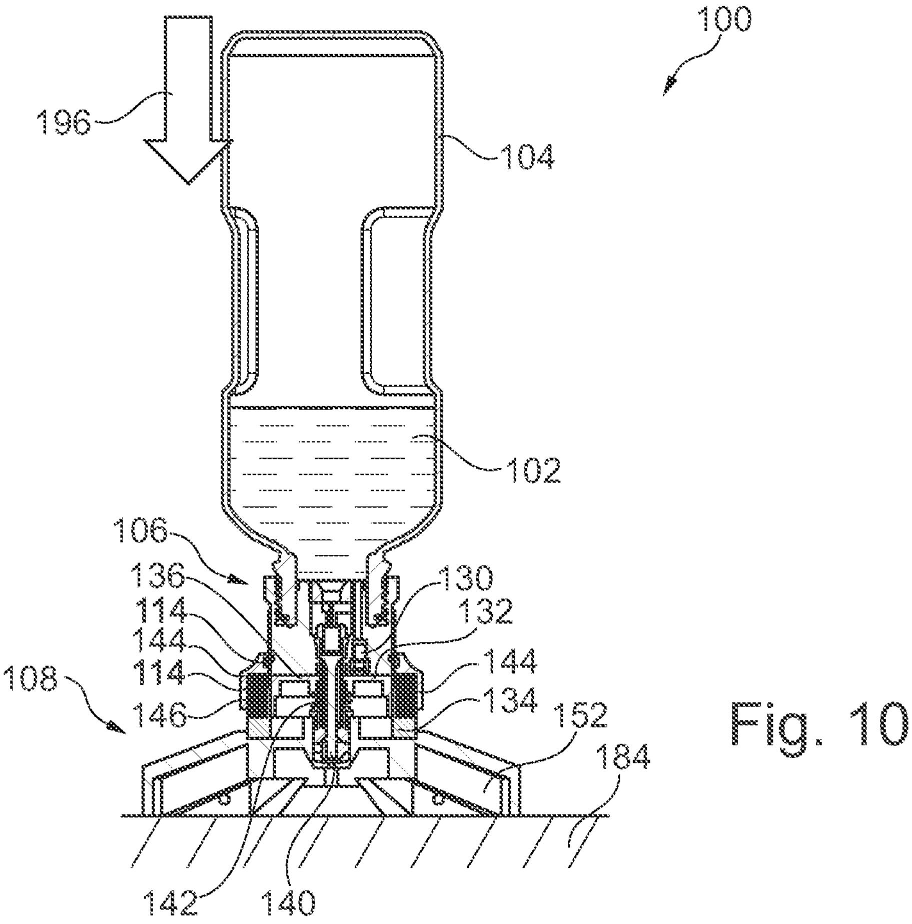
FIG. 10 shows a cross-sectional view of the mobile phase supply device and according to FIG. 3 to FIG. 9 in a third operation state.
Figure 11:
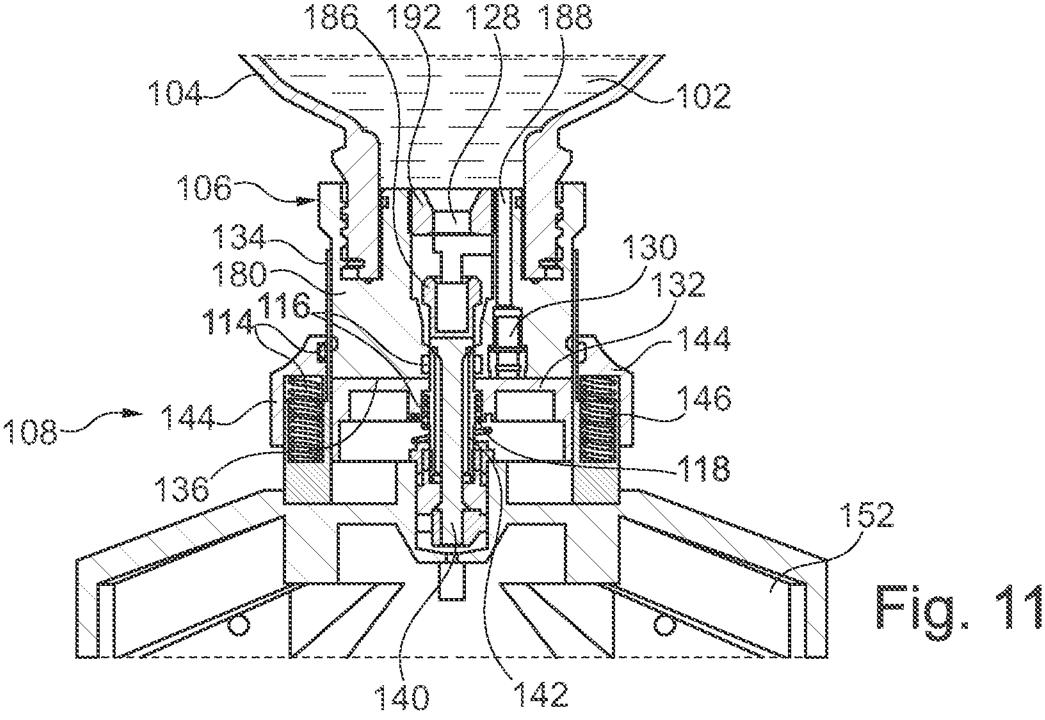
FIG. 11 shows a cross-sectional view of the cap device and the port device of the mobile phase supply device shown in FIG. 10 in the third operation state.

FIG. 10 shows a cross-sectional view of the mobile phase supply device 100 and FIG. 11 shows a cross-sectional view of the cap device 106 and the port device 108 of the mobile phase supply device 100 according to FIG. 3 to FIG. 9 in a third operation state.

According to FIG. 10 and FIG. 11, main body 180 of cap device 106 starts to pull down face body 132 of port device 108. As a result, face body 132 presses punch sleeve 142 downwardly. The cap device 106 and the port device 108 are not yet interlocked. A first stage of sealing is achieved, since a part of the port device 108 is sealed by the cap device 106. However, fluidic path 110 has not yet been opened between cap device 106 and port device 108.

Descriptively speaking, the capped bottle has been inserted into the port, and about 80% of pulling down has been done. Port and capped bottle are still both sealed. The port sided fluid path is inserted into the cap. The cap seals the port-sided fluid path.

Figure 12:
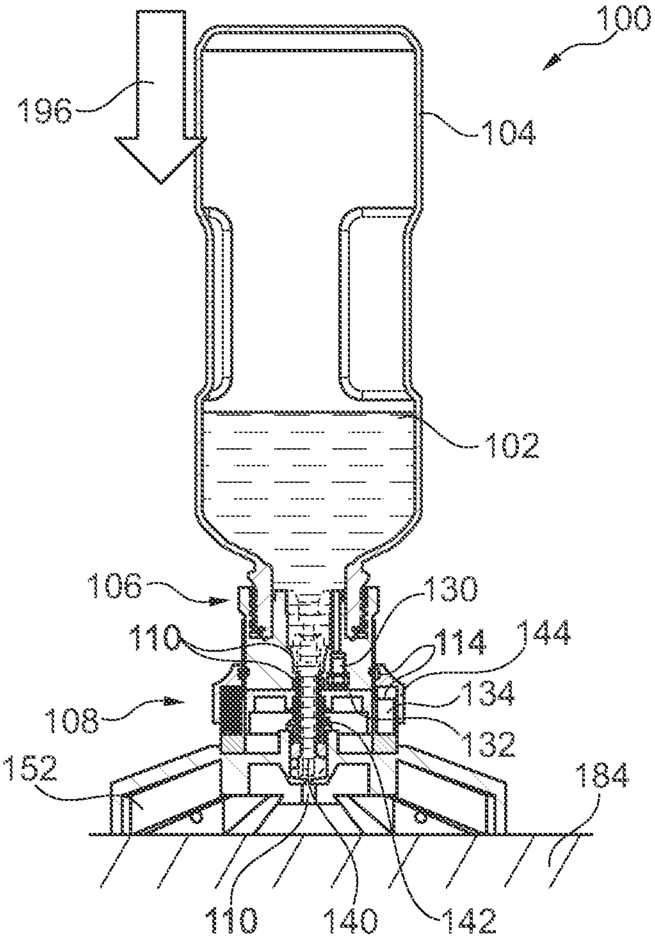
FIG. 12 shows a cross-sectional view of the mobile phase supply device according to FIG. 3 to FIG. 11 in a fourth operation state.
Figure 13:
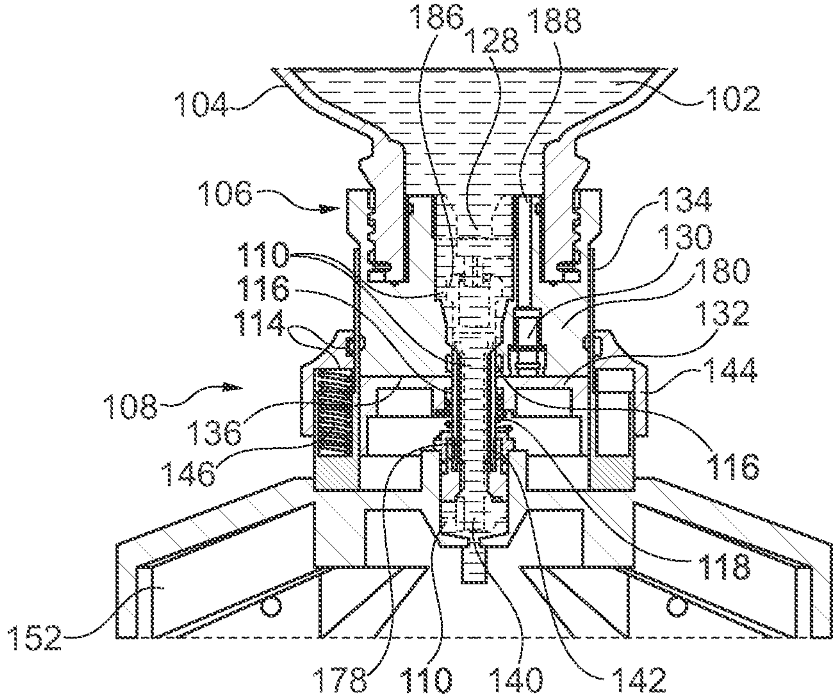
FIG. 13 shows a cross-sectional view of the cap device and the port device of the mobile phase supply device shown in FIG. 12 in the fourth operation state.

FIG. 12 shows a cross-sectional view of the mobile phase supply device 100 and FIG. 13 shows a cross-sectional view of the cap device 106 and the port device 108 of the mobile phase supply device 100 according to FIG. 3 to FIG. 11 in a fourth operation state.

According to FIG. 12 and FIG. 13, the cap device 106 is not yet interlocked with the port device 108. The movable punch sleeve 142 has been displaced downwardly with respect to the pin 140, and has opened an annular gap between movable sleeve 142 and stationary pin 140. Hence, the movable sleeve 142 has moved in axial direction downwardly relative to the stationary pin 140 so that the annular gap 178 in between has been opened to form part of fluidic path 110. As a result, mobile phase 102 flows between stationary pin 140 and movable sleeve 142.

To obtain the configuration according to FIG. 12 and FIG. 13 based on the configuration of FIG. 10 and FIG. 11, a user continues to pull down the mobile phase container 104 with connected cap device 106 into the port device 108. The bottle is now inserted with a major part, and about 95% of pulling down is completed. The port-sided fluid path has started to be opened and mobile phase 102 starts running down into the port and the solvent lines. The cap seals the port-sided fluid path.

Figure 14:
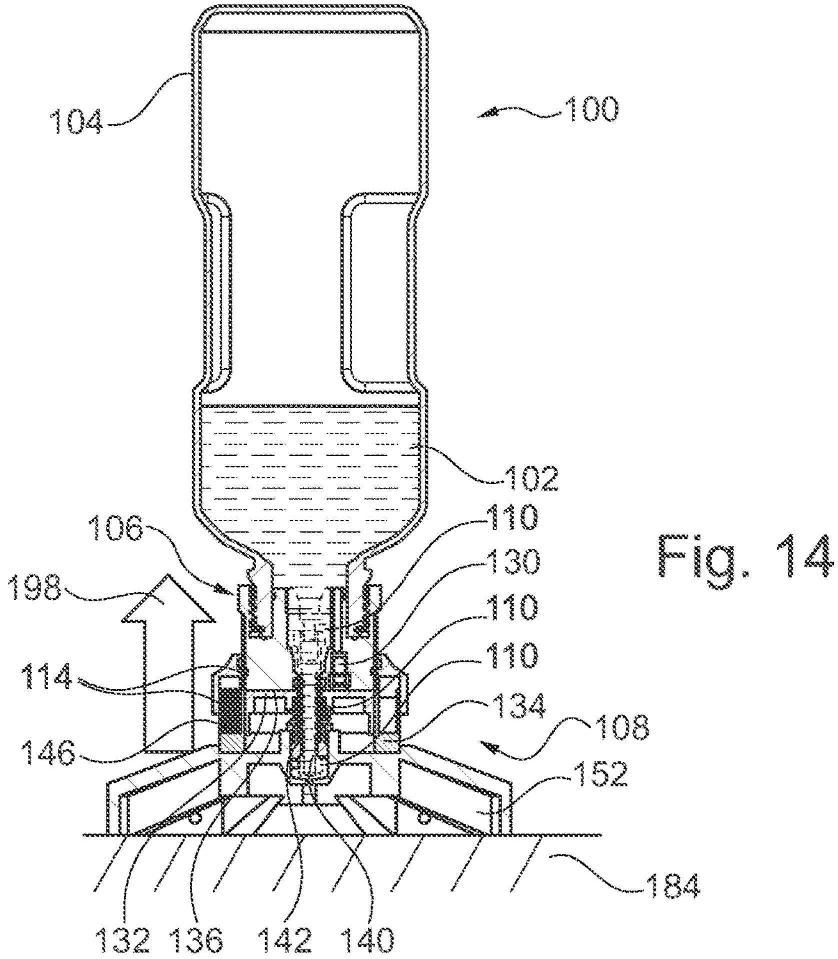
FIG. 14 shows a cross-sectional view of the mobile phase supply device according to FIG. 3 to FIG. 13 in a fifth operation state.

FIG. 14 shows a cross-sectional view of the mobile phase supply device 100 and FIG. 15 shows a cross-sectional view of the cap device 106 and the port device 108 of the mobile phase supply device 100 according to FIG. 3 to FIG. 13 in a fifth operation state.

According to FIG. 14 and FIG. 15, the cap device 106 on mobile phase container 104 has been interlocked with port device 108. Locking bodies 148 have slid into locking recess 150 of cap device 106, whereby cap device 106 and port device 108 are in a mutually locked state. A continuous fluidic path 110 from mobile phase container 104 through cap device 106 and through port device 108 has been opened or created. The fluid drive 20 may drive mobile phase 102, supported by the force of gravity, through sample separation apparatus 10.

In order to release or unlock the locked configuration of FIG. 14 and FIG. 15, a user can press the locking sleeve 144 downwardly. As a result, the springs (see reference signs 118, 194) cooperating with the punch sleeve 142 and the face sleeve or face body 132 release the cap device 106, and the latter can experience an upwardly oriented spring force. Upon releasing the mobile phase container 104 together with the cap device 106, the previously opened fluidic path 110 is closed again, under the influence of the various springs.

Hence, the bottle is mechanically locked in the configuration according to FIG. 14 and FIG. 15. The bottle has been inserted, and the process of pulling down has been completed. The port sided fluidic path 110 is fully opened and mobile phase 102 is running down into the port device 108 and connected solvent lines or tubing 112. The cap device 106 seals the port-sided fluid path. Furthermore, the cap device 106 is mechanically locked in the port device 108.

More generally, exemplary embodiments of the invention provide a cap device and port device that cooperate with each other. Advantageously, a user does not have to care about tube handling at any time. No special orientation (rotational wise) of the capped bottle is needed to be inserted properly into the port. Advantageously, a safe and easy handling of the mobile phase supply device is enabled, because a user can always use both hands for any bottle orientation. Bottle and port may be both sealed tight when not connected to each other.

Exemplary embodiments of the invention may provide a dripless coupling that is always in defined states, and no fluid can escape from port or bottle at any time (the port device sided fluid path is always only then opened when inserted into and sealed by the cap device, and is always closed before exiting the cap device). Advantageously, a mechanical lock may be provided that needs intended action of a user to be released.

In an alternative embodiment with regard to the above described process, a fluidic path in cap device and port device may be partially opened before the mechanical locking has taken place.

It may be preferred to have the mechanical lock done before the fluidic path gets opened. This can be achieved easily by coupling a movement of a spring-loaded locking sleeve to the inner parts of the port device. When the bottle is inserted all the way (and the fluidic path is still closed), the locking sleeve may automatically travel upwards and with this movement, the fluidic path can be opened. This may improve the safety of the whole system.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A mobile phase supply device for supplying a mobile phase for a sample separation apparatus for separating a fluidic sample, the mobile phase supply device comprising:
- a fluidically normally closed cap device mounted or configured to be mounted on a mobile phase container containing a mobile phase; and
- a fluidically normally closed port device configured for being mechanically connected with the cap device in such a way that, upon establishing a mechanical connection between the port device and the cap device, both the port device and the cap device are converted into a fluidically opened configuration,
- wherein the port device and the cap device are configured so that establishing the mechanical connection is enabled in any mutual rotational orientation between the port device and the cap device.

2. The mobile phase supply device according to claim 1, wherein the port device and the cap device are configured so that, upon establishing the mechanical connection between the port device and the cap device, a fluidic path is formed which establishes a fluid communication between the port device and the cap device.

3. The mobile phase supply device according to claim 1, wherein the cap device mounted or configured to be mounted on the mobile phase container is tubeless.

4. The mobile phase supply device according to claim 1, further comprising tubing connected to the port device.

5. The mobile phase supply device according to claim 1, wherein the port device and the cap device are configured so that, upon establishing a mechanical connection between the port device and the cap device, mobile phase in the mobile phase container flows towards the port device supported by the force of gravity.

6. The mobile phase supply device according to claim 1, wherein the port device and the cap device are configured so that upon establishing a mechanical connection between the port device and the cap device, the mobile phase container is oriented upside down, or is oriented tilted with regard to a vertical direction.

7. The mobile phase supply device according to claim 1, further comprising at least one of the following features:
- wherein the normally closed port device comprises a port biasing element configured for biasing the port device in a fluidically closed configuration unless the mechanical connection between the port device and the cap device is established, wherein the port biasing element is configured for generating a biasing force oriented in a port sealing direction for biasing the port device in the fluidically closed configuration;
- wherein the normally closed cap device comprises a cap biasing element configured for biasing the cap device in a fluidically closed configuration unless the mechanical connection between the port device and the cap device is established, wherein the cap biasing element is configured for generating a biasing force oriented in a cap sealing direction for biasing the cap device in the fluidically closed configuration;
- wherein the cap device comprises an annular accommodation recess accommodating or configured for accommodating an open mobile phase outlet of the mobile phase container;
- wherein the cap device comprises an annular accommodation recess accommodating or configured for accommodating an open mobile phase outlet of the mobile phase container, and wherein the annular accommodation recess comprises an internal thread and the open mobile phase outlet comprises an external thread corresponding to the internal thread;
- wherein the cap device comprises a filter element configured for filtering mobile phase when flowing from the mobile phase container towards the port device;
- wherein the cap device comprises a vent valve configured for automatically venting the mobile phase container in the event of a negative pressure in the mobile phase container for at least partially compensating for the negative pressure.

8. The mobile phase supply device according to claim 1, further comprising at least one of the following features:
- wherein the port device comprises a locking sleeve, a locking biasing element biasing the locking sleeve towards the cap device, and at least one locking body being guidable by the locking sleeve and being radially movable into a locking recess in a lateral surface of the cap device for locking the port device and the cap device upon establishing the mechanical connection between the port device and the cap device;
- wherein the port device comprises a stand for standing on a ground;
- wherein the port device and the cap device are configured in such a way that, upon releasing the mechanical connection between the port device and the cap device, both the port device and the cap device automatically return into the fluidically closed configuration.

9. The mobile phase supply device according to claim 1, wherein the port device and the cap device are configured so that before opening a fluidic path between the port device and the cap device by establishing a mechanical connection between the port device and the cap device, the fluidic path is closed by the port device and/or by the cap device.

10. The mobile phase supply device according to claim 9, wherein the port device and the cap device are configured so that closing the fluidic path before establishing the mechanical connection is accomplished by a plurality of cooperating sealing elements at the port device and at the cap device.

11. The mobile phase supply device according to claim 1, comprising a locking mechanism configured to lock the port device and the cap device upon establishing the mechanical connection.

12. The mobile phase supply device according to claim 11, wherein the locking mechanism is configured for being unlockable only by execution of a predefined user activity.

13. The mobile phase supply device according to claim 11, wherein the locking mechanism is configured for locking the port device and the cap device before, during or after forming a fluidic path between the port device and the cap device.

14. The mobile phase supply device according to claim 11, wherein the locking mechanism is configured as one selected from the group consisting of: a ball locking mechanism; and a push-to-open and push-to-close mechanism.

15. A mobile phase supply device for supplying a mobile phase for a sample separation apparatus for separating a fluidic sample, the mobile phase supply device comprising:
- a fluidically normally closed cap device mounted or configured to be mounted on a mobile phase container containing a mobile phase; and
- a fluidically normally closed port device configured for being mechanically connected with the cap device in such a way that, upon establishing a mechanical connection between the port device and the cap device, both the port device and the cap device are converted into a fluidically opened configuration, wherein:
- the port device comprises a face body mounted movably in a stationary carrier body and configured for being moved by a facing front of a main body of the cap device upon establishing the mechanical connection between the port device and the cap device; and
- the mobile phase supply device further comprises at least one of the following features:
  - wherein the face body and the facing front of the main body are shaped to form one selected from the group consisting of: a flat face coupling; and a cone-type coupling;
  - wherein the face body has a through hole through which a stationary pin and a movable sleeve surrounding the pin extend, wherein the sleeve is configured to move relatively to the pin upon establishing the mechanical connection between the port device and the cap device to thereby form at least part of a fluidic path in a gap between the pin and the sleeve for enabling a flow of mobile phase from the cap device to the port device along the fluidic path.

16. The mobile phase supply device according to claim 15, comprising a locking mechanism configured to lock the port device and the cap device upon establishing the mechanical connection.

17. A sample separation apparatus for separating a fluidic sample, wherein the sample separation apparatus comprises:
- a fluid drive for driving a mobile phase and the fluidic sample when injected in the mobile phase;

a sample separation unit for separating the fluidic sample in the mobile phase; and the mobile phase supply device according to claim 1 for supplying the mobile phase to the fluid drive.

18. The sample separation apparatus according to claim 17, wherein the sample separation apparatus comprises at least one of the following features:

the sample separation apparatus is configured as a chromatography sample separation apparatus;

the sample separation apparatus comprises a detector configured to detect the separated fluidic sample;

the sample separation apparatus comprises a fractioner unit configured to collect separated fractions of the fluidic sample;

the sample separation apparatus comprises an injector configured to inject the fluidic sample in the mobile phase.

19. A sample separation apparatus for separating a fluidic sample, wherein the sample separation apparatus comprises:

a fluid drive for driving a mobile phase and the fluidic sample when injected in the mobile phase;

a sample separation unit for separating the fluidic sample in the mobile phase; and the mobile phase supply device according to claim 15 for supplying the mobile phase to the fluid drive.

* * * * *